H. G. MOUNTAIN.
HINGE JOINT FOR ARTIFICIAL LIMBS.
APPLICATION FILED JUNE 8, 1920.
1,365,532.
Patented Jan. 11, 1921.
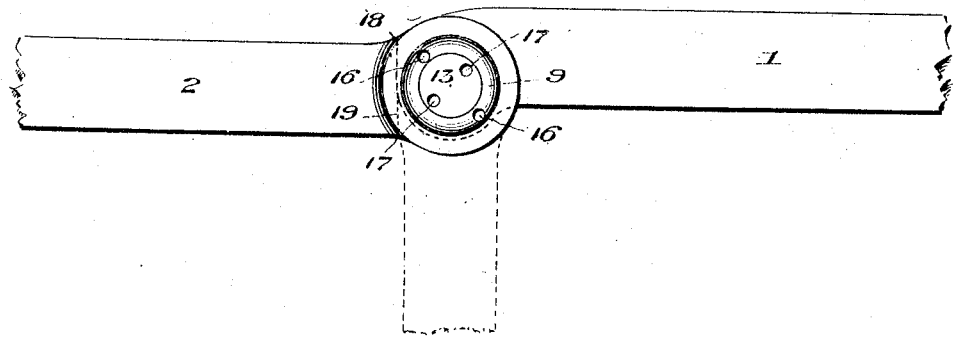
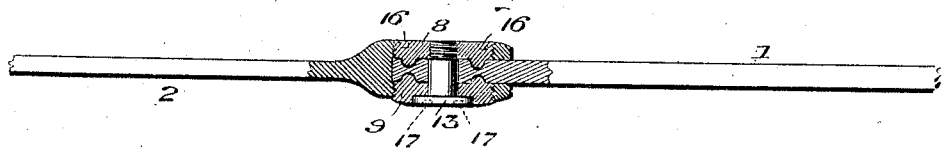
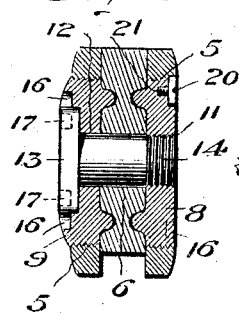
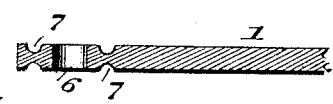
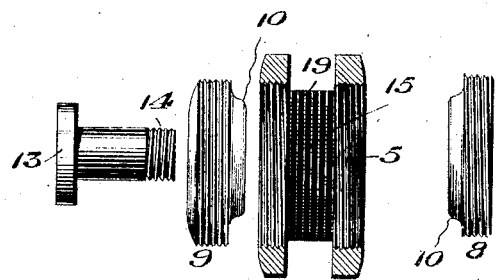

UNITED STATES PATENT OFFICE.

HERBERT G. MOUNTAIN, OF WASHINGTON, DISTRICT OF COLUMBIA.

HINGE-JOINT FOR ARTIFICIAL LIMBS.

1,365,532.     Specification of Letters Patent.     Patented Jan. 11, 1921.

Application filed June 8, 1920. Serial No. 387,282.

*To all whom it may concern:*

Be it known that I, HERBERT G. MOUNTAIN, a citizen of the United States, residing at Washington, in the District of Columbia, have invented certain new and useful Improvements in Hinge-Joints for Artificial Limbs, of which the following is a specification.

My invention relates to an improvement in hinge joints for artificial limbs.

One of the objects is to provide a joint which will afford perfect freedom of movement in the two directions required, more particularly at the knee, and at the same time provide means for eliminating all lateral play in the joint, and for taking up wear, while providing against the parts of the joint accidentally working loose.

The hinge joint includes two metal bars which serve in place of the upper and lower leg respectively, one of which has a knuckle at the end which fits and receives the other. The knuckle has threaded holes to receive externally threaded nuts, each of which have annular ridges adapted to enter and fit grooves in the other part of the hinge formed therefor, and a screw which extends through registering openings axially formed in the several members of the joint, and which screw has a left-hand thread which screws into one of the nuts to constitute a lock to prevent accidental dismemberment of the constituent parts of the joint.

In the accompanying drawings:

Figure 1 is a fragmentary side view;

Fig. 2 is a similar view from the top with a portion through the joint broken away;

Fig. 3 is an enlarged transverse section;

Fig. 4 is a view showing the two main parts forming the joint separated;

Fig. 5 shows the several parts of the joint separated.

The numerals 1 and 2 constitute the upper and lower parts of the leg forming the knee joint.

The upper part 1 terminates in the knuckle 3 having the space 4 between its two parts, each of which has a right-hand threaded hole 5. One end of the lower leg part 2 fits the space 4, and is provided with a hole 6 therethrough, and with annular grooves 7 on either side concentric with the hole 6.

The externally-threaded nuts 8 and 9 screw into these threaded holes 5 from opposite sides of the knuckle, and are each provided with annular ribs 10 adapted to enter and fit the grooves 7 of the lower leg part 2, as shown in Figs. 2 and 3. The nut 8 has a threaded hole 11 in the center, and its companion nut 9 has a smooth hole 12, which holes 11 and 12 are adapted to aline perfectly with the hole 6 of the lower leg part 2, when the several parts of the hinge knee joint are assembled, as shown in Figs. 2 and 3.

A screw 13 having a left-hand thread 14 is adapted to extend through these alined holes 6, 11 and 12, and be countersunk in a hole 15 formed for its head in the outer surface of the nut 9, and screw into the threaded hole 11, as shown in Figs. 2 and 3. The nuts 8 and 9 and the head of the screw 13 are provided with holes 16 and 17, respectively, as shown in Figs. 1 and 3, to receive a spanner or wrench (not shown) for tightening the nuts and screw.

To assemble the joint, the end of the lower leg part 2 is inserted in the space 4 of the upper leg part 1, the nuts 8 and 9 are then screwed into place as tight as required to take up wear, after which the screw 13 is introduced and screwed into place, it acting as a lock for the two nuts 8 and 9.

It is understood, of course, the usual shoulders 18 and 19 are provided to limit the movement of the joint in one direction.

In this way, an effectual means is provided for making a tight and yet flexible artificial knee joint, which may be tightened or loosened at any time when required, by simply applying the wrench and turning the nuts and screw until the joint is as tight as required, without the service of a mechanic being required for the work.

A screw 20 might be screwed into a threaded hole 21 in the nut 8 with its head countersunk therein and in the adjacent part of the knuckle, as shown in Fig. 3, should it be found desirable as a means for absolutely preventing the nut 8 from turning.

I claim:

1. A joint for artificial limbs, including two interfitting parts, one of which is in the form of a knuckle having threaded orifices, and the other having a hole transversely therethrough, with concentric grooves on opposite sides thereof, external screw-threaded nuts adapted to screw into the threaded orifices of the knuckle, and each having a concentric rib adapted to fit one of the concentric grooves of the other part, said nuts each having a central hole in alinement with the hole through the part having the concentric grooves, and a screw extending through the axial center of said parts to form an axis therefor, it being provided with a thread opposite to that of the threaded nut which is adapted to screw into a corresponding thread in the hole in one of the nuts to lock the nuts against accidental turning.

2. A joint for artificial limbs including two interfitting parts, one of which is in the form of a knuckle having threaded orifices, and the other having a hole transversely therethrough, with concentric grooves on opposite sides thereof, external screw-threaded nuts adapted to screw into the threaded orifices of the knuckle and each having a concentric rib adapted to fit one of the concentric grooves of the other part, said nuts each having a central hole in alinement with the hole through the part having the concentric grooves, and a removable screw extending through the axial center of said parts to form an axis therefor, and a set-screw arranged in one of said nuts adapted to intersect the threads of the nut and of the knuckle, whereby the nut is prevented from turning relative thereto.

In testimony whereof I affix my signature.

HERBERT G. MOUNTAIN.